(12) United States Patent
Zambelli et al.

(10) Patent No.: US 11,854,712 B2
(45) Date of Patent: Dec. 26, 2023

(54) X-RAY COLLIMATOR AND RELATED X-RAY INSPECTION APPARATUS

(71) Applicant: DUE2LAB S.R.L., Parma (IT)

(72) Inventors: Nicola Zambelli, Scandiano (IT); Giacomo Benassi, Reggio Emilia (IT)

(73) Assignee: DUE2LAB S.R.L., Scandiano (IT)

( * ) Notice: Subject to any disclaimer, the term of this patent is extended or adjusted under 35 U.S.C. 154(b) by 107 days.

(21) Appl. No.: 17/510,857

(22) Filed: Oct. 26, 2021

(65) Prior Publication Data
US 2022/0130568 A1    Apr. 28, 2022

(30) Foreign Application Priority Data
Oct. 27, 2020    (IT) .......................... 102020000025474

(51) Int. Cl.
*G01N 23/02*    (2006.01)
*G01N 23/20*    (2018.01)
(Continued)

(52) U.S. Cl.
CPC ............. *G21K 1/025* (2013.01); *G01N 23/02* (2013.01); *G01N 23/20* (2013.01); *G01N 23/20008* (2013.01); *G01N 2223/03* (2013.01); *G01N 2223/052* (2013.01); *G01N 2223/1016* (2013.01); *G01N 2223/204* (2013.01); *G01N 2223/302* (2013.01); *G01N 2223/303* (2013.01); *G01N 2223/308* (2013.01); *G01N 2223/316* (2013.01); *G01N 2223/3307* (2013.01); *G01N 2223/3308* (2013.01);
(Continued)

(58) Field of Classification Search
None
See application file for complete search history.

(56) References Cited

U.S. PATENT DOCUMENTS

| 3,909,615 A | * | 9/1975 | Bosch | .................... G01N 23/16 |
| | | | | 250/496.1 |
| 4,002,911 A | * | 1/1977 | Hounsfield | .......... G01N 23/083 |
| | | | | 378/19 |

(Continued)

FOREIGN PATENT DOCUMENTS

| CN | 201790819 U | * | 4/2011 | |
| DE | 102018112054 A1 | * | 11/2019 | ............... G21K 1/02 |

(Continued)

*Primary Examiner* — Thomas R Artman
(74) *Attorney, Agent, or Firm* — Browdy and Neimark, PLLC

(57) ABSTRACT

An X-ray collimator (30) that comprises:
a collimator body (31) comprising:
  a collimation conduit (32) provided with an inlet (320), configured to be connected to an X-ray source (20) for the inlet of a beam (B) of X-rays, and an outlet (321), configured to emit a collimated portion (B1) of the X-ray beam (B); and
  a derivation conduit (33) inclined with respect to the collimation conduit (32), wherein the derivation conduit (33) is provided with an inlet (330), configured to be connected to the X-ray source (20) for the inlet of a peripheral portion (B2) of the same X-ray beam (B) emitted by the source (20), and an outlet (331);
a reference detector (40) fixed to the collimator body (31) and provided with an inlet window (41) facing the outlet (331) of the derivation conduit (33).

11 Claims, 3 Drawing Sheets

(51) Int. Cl.
*G01N 23/20008* (2018.01)
*G21K 1/02* (2006.01)

(52) U.S. Cl.
CPC . *G01N 2223/503* (2013.01); *G01N 2223/633* (2013.01); *G01N 2223/643* (2013.01); *G01N 2223/645* (2013.01)

(56) References Cited

U.S. PATENT DOCUMENTS

| | | | | |
|---|---|---|---|---|
| 4,246,488 A | * | 1/1981 | Hura | G21K 1/10 378/151 |
| 4,803,711 A | * | 2/1989 | Tsujii | G01N 23/04 378/4 |
| 5,050,201 A | * | 9/1991 | Baecklund | G01N 23/16 378/204 |
| 5,745,548 A | * | 4/1998 | Dobbs | H05G 1/26 378/207 |
| 7,092,489 B2 | * | 8/2006 | Li | G21K 1/02 403/338 |
| 7,397,899 B2 | * | 7/2008 | Li | G21K 1/02 378/205 |
| 7,639,781 B2 | * | 12/2009 | Shampine | G21K 1/10 250/269.1 |
| 7,684,540 B2 | * | 3/2010 | Groves | G01N 33/2841 378/53 |
| 8,447,012 B2 | * | 5/2013 | Ichizawa | G01T 7/005 378/113 |
| 9,111,379 B2 | * | 8/2015 | Gregerson | A61B 6/4283 |
| 9,208,918 B2 | * | 12/2015 | Tybinkowski | A61B 6/06 |
| 9,576,378 B2 | * | 2/2017 | Gregerson | A61B 6/44 |
| 9,892,810 B2 | * | 2/2018 | Kwerreveld | G21F 1/085 |
| 9,978,157 B2 | * | 5/2018 | Gregerson | A61B 6/563 |
| 10,458,928 B2 | * | 10/2019 | Chen | G01N 23/083 |
| 2006/0126791 A1 | * | 6/2006 | Li | G21K 1/02 378/147 |
| 2006/0126792 A1 | * | 6/2006 | Li | G21K 1/02 378/147 |
| 2007/0291898 A1 | * | 12/2007 | Groves | G01N 33/2841 378/51 |
| 2008/0069307 A1 | * | 3/2008 | Shampine | G01N 23/083 378/194 |
| 2008/0152080 A1 | | 6/2008 | Shampine et al. | |
| 2011/0013748 A1 | | 1/2011 | Ichizawa et al. | |
| 2014/0003572 A1 | * | 1/2014 | Gregerson | A61B 6/56 378/4 |
| 2014/0140471 A1 | * | 5/2014 | Tybinkowski | A61B 6/032 378/19 |
| 2015/0332484 A1 | * | 11/2015 | Gregerson | A61B 6/5205 378/19 |
| 2017/0124731 A1 | * | 5/2017 | Gregerson | G06T 7/0012 |
| 2017/0256329 A1 | * | 9/2017 | Kwerreveld | G21K 1/04 |
| 2018/0292333 A1 | * | 10/2018 | Chen | G01N 23/02 |
| 2019/0285561 A1 | * | 9/2019 | Uchida | G01B 11/06 |
| 2022/0130568 A1 | * | 4/2022 | Zambelli | G01N 23/20008 |

FOREIGN PATENT DOCUMENTS

| | | |
|---|---|---|
| GB | 2181330 A | 4/1987 |
| JP | 2015169455 A | 9/2015 |
| KR | 20070005036 A | 1/2007 |
| WO | 2019180407 A1 | 9/2019 |

* cited by examiner

X-RAY COLLIMATOR AND RELATED X-RAY INSPECTION APPARATUS

TECHNICAL FIELD

The present invention relates in general to the non-invasive analysis of samples of material (or products in general) by means of X-rays.

More particularly, the invention relates to an X-ray collimator and an X-ray inspection (and/or analysis) apparatus for non-invasive analysis of samples of material to be analysed.

PRIOR ART

It is known that certain qualities or physical properties of products and manufactured goods, such as density and/or chemical composition, can be determined by X-ray analysis using a beam of X-rays in transmission, reflection or in both measurement geometries. The photon beam produced by the X-ray sources, such as an X-ray tube, produces new X-ray beams because it is partly transmitted and partly reflected when the initially produced X-ray beam hits a sample of material to be analysed. By analysing that beam of X-rays transmitted or reflected by the sample of material, it is possible to obtain information about the physical nature of the object itself. For example, it is well known that the acquisition of the X-ray beam transmitted through a sample of a given material gives the opportunity to measure the surface mass density $\rho_s$ of the sample of material analysed, according to Lambert Beer law, i.e. according to the following relation:

$$\log I_0/I = \rho_s \Psi$$

where, $I_0$ is the intensity of the X-ray beam emitted by the X-ray source (i.e. incident on the sample of material), I is the intensity of the X-ray beam transmitted by (i.e. exiting) the sample of material and $\Psi$ is a material-specific constant of the material of which the sample of material is made.

An X-ray inspection apparatus generally comprises an X-ray source (or X-ray tube, i.e. an electron accelerator), which is configured to generate an X-ray beam, usually in the shape of a conical fan.

For this reason, the X-ray inspection apparatus normally comprises a collimator placed between the X-ray source and the sample of material to be analysed. The collimator is employed to shield the redundant beam of the X-ray beam, i.e. to select only the central portion of the X-ray beam that is less divergent than the beam itself in order to direct it towards the sample of material to be analysed.

The X-ray inspection apparatus further comprises a measurement detector, which is placed in a position such to receive the transmitted and/or reflected X-ray beam from the sample of material, so as to measure the intensity I of this transmitted and/or reflected X-ray beam.

By measuring the intensity I of the transmitted and/or reflected X-ray beam, the intensity $I_0$ of the X-ray beam emitted by the X-ray source being known, the X-ray inspection apparatus is able to determine the desired physical quantity of the sample of material, such as the mass surface density of the sample of material.

It is perceived in the field the need to make the determination of the physical quantity to be measured increasingly reliable and precise.

In fact, it has been observed that even a temporary variation/fluctuation (e.g. due to a voltage drop during the measurement or physiological irregularities in the emission of the X-ray beam by the X-ray source) in the intensity $I_0$ of the X-ray beam emitted by the X-ray source may cause an error or inaccuracy in determining the correct value of the physical quantity or, in any case, a low accuracy in the measurement.

An object of the present invention is to meet the aforesaid and other requirements of the prior art, with a simple, rational and low-cost solution.

Such objects are achieved by the characteristics of the invention reported in the independent claims. The dependent claims outline preferred and/or particularly advantageous aspects of the invention.

DISCLOSURE OF THE INVENTION

The invention, in particular, makes available an X-ray collimator that comprises:
- a collimator body comprising:
  - a collimation conduit provided with an inlet, configured to be connected to an X-ray source for the inlet of a beam of X-rays, and an outlet, configured to emit a collimated portion of the X-ray beam; and
  - a derivation conduit inclined with respect to the collimation conduit, wherein the derivation conduit is provided with an inlet, configured to be connected to the X-ray source (20) for the inlet of a peripheral portion (B2) of the same X-ray beam (B) emitted by the source (20), and an outlet;
- a reference detector fixed to the collimator body and provided with an inlet window facing the outlet of the derivation conduit.

It has been observed that, thanks to the configuration of the collimator, it is possible to position the reference detector close to the source, so that it can intercept part of the beam coming from the source, without affecting the beam arriving at the object.

Substantially, thanks to this solution, it is possible to obtain reliable and accurate measurements in any condition of use.

In practice, it is possible to make direct measurements of incident intensity in certain systems (e.g. density measurement of a fluid in a pipe).

In addition, it is possible to make precise and accurate measurements even if the emission of the beam from the X-ray source fluctuates over time, as such fluctuations have a direct influence on the accuracy of measurements in known systems.

Measuring continuously the beam emitted by the X-ray source, by means of the reference detector thus positioned in the collimator, allows the accuracy of the measurement made by the inspection apparatus to be optimised.

Advantageously, the collimator may comprise a housing seat configured to house at least one portion of the reference detector, wherein the outlet of the derivation conduit leads into said housing seat at the inlet window of the reference detector.

According to an aspect of the invention, the distance between the outlet and the inlet of the derivation conduit can be advantageously less than the distance between the outlet and the inlet of the collimation conduit.

According to one embodiment, the derivation conduit may branch (directly) from the collimation conduit diverging therefrom and the inlet of the derivation conduit, in that case, communicates with the collimation conduit.

For example, this embodiment allows the peripheral portion of the beam to be channelled along the derivation conduit when the focus of the X-ray beam is placed within the collimation conduit.

According to an (alternative) further embodiment, the derivation conduit can be separated from the collimation conduit and the inlet of the derivation conduit is placed alongside the inlet of the collimation conduit and at a non-null distance from it.

For example, this embodiment allows the peripheral portion of the beam to be channelled along the derivation conduit when the focus of the X-ray beam is located outside (and upstream of) the collimation conduit.

In addition, the collimator body may comprise an attachment flange configured to be connected to the X-ray source.

For example, the inlet of the collimation conduit and/or the derivation conduit is located (flush with and) near the attachment flange.

For the same above mentioned purposes, the invention makes available an X-ray inspection apparatus on a sample of material to be analysed that comprises:
   an X-ray source configured to generate an X-ray beam;
   a collimator of the X-ray beam emitted by the source, as described above; and
   a measurement detector.

According to an aspect of the invention, the measurement detector may face the outlet of the collimation conduit and at a non-null distance therefrom so as to receive X-rays transmitted through the sample of material, between the outlet of the collimation conduit and the measurement detector a gap being defined in which the sample of material is adapted to be housed.

Alternatively or additionally, the measurement detector can be placed alongside the outlet of the collimation conduit and at a non-null distance from it, in a position such to receive X-rays reflected by the sample of material.

According to a further aspect of the invention, the apparatus may comprise a support frame to which the X-ray source, the X-ray collimator and (e.g. also) the measurement detector are rigidly fixed.

Preferably, then, the apparatus may comprise an electronic control unit operatively connected to the measurement detector and the reference detector, wherein the electronic control unit may be configured to:
   a) compare a measured value of the intensity of the X-ray beam measured in a predetermined time interval by the measurement detector with a reference value of the intensity of the X-ray beam measured in the same time interval by the reference detector; and
   b) determine a value of a parameter indicative of the type of the sample of material on the basis of the comparison between the measured value and the reference value.

Preferably, the indicative parameter may be a mass surface density.

BRIEF DESCRIPTION OF THE DRAWINGS

Further features and advantages of the invention will be more apparent after reading the following description provided by way of a non-limiting example, with the aid of the accompanying drawings.

BEST MODE TO IMPLEMENT THE INVENTION

Figure 1:
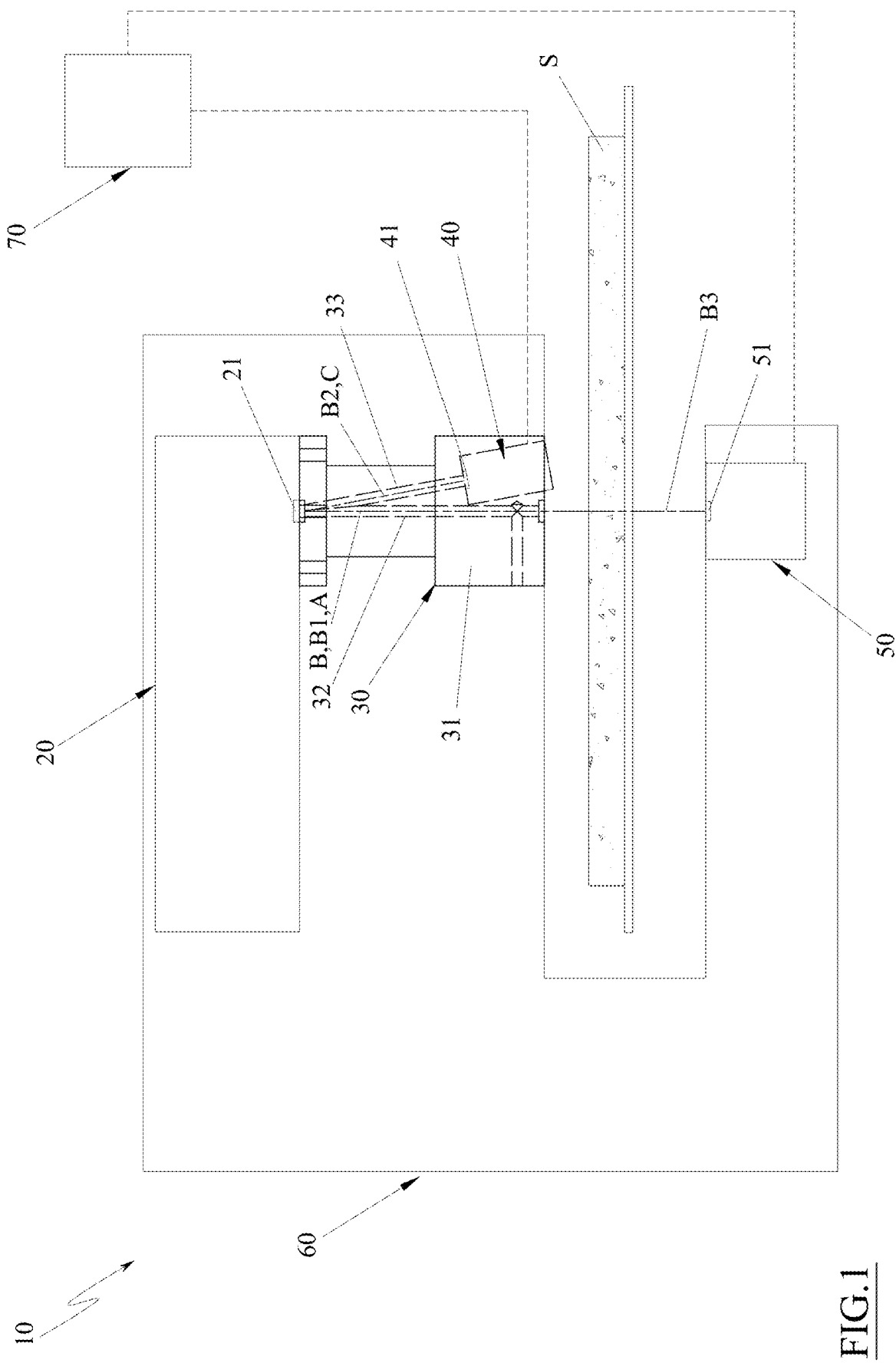
FIG. 1 is a schematic view of an inspection apparatus according to the invention (installed in a plant).
Figure 3:
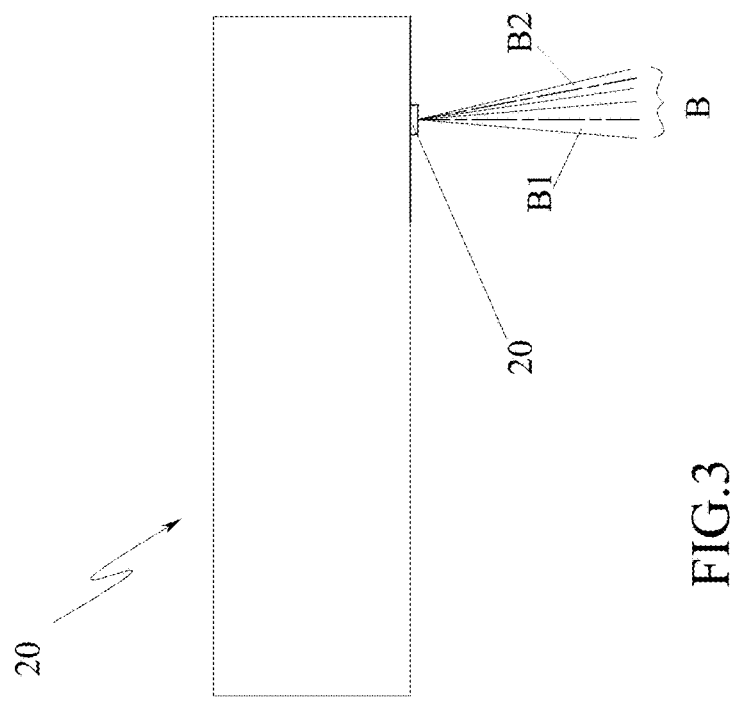
FIG. 3 is a schematic view of an X-ray source with the X-ray beam generated by it.

With particular reference to these figures, 10 globally refers to an X-ray inspection apparatus for determining and measuring a physical quantity of a sample of material, e.g. an object or a (finished) product or a portion thereof, globally referred to by the letter S.

The apparatus 10 comprises an X-ray source 20 configured to generate and emit an X-ray beam, generically referred to by the letter B.

The beam B has a substantially conical fan shape and is directed along a rectilinear central axis.

The conicity of the beam B emitted by source 20 is substantially comprised between 10° and 45°.

The source 20, for example, comprises or consists of an X-ray tube.

The source 20 is provided with an emission window 21, for example circular, from which the beam B exits (perpendicular to it).

The apparatus 10 also includes a collimator 30, which is configured to collimate the beam B emitted by the source 20.

The collimator 30 comprises a collimator body 31, for example substantially cylindrical or prismatic, having a longitudinal axis A, which in use is arranged parallel (and coaxial) to the central axis of the beam B emitted by the source 20.

The collimator body 31 comprises a first axial end, intended to be arranged proximal to the source 20, and an opposite second axial end.

The collimator body 31 is, preferably, made in a single body or is made of a plurality of bodies assembled and rigidly fixed together.

In the collimator body 31, a collimation conduit 32 is made that is provided with an inlet 320, configured to be connected to the (emission window 21 of the) source 20 for the inlet of the beam B generated by it.

For example, the inlet 320 is arranged substantially in contact with (or proximal to) the emission window 21 of the source 20 and, preferably, has a shape and size equal to the shape and size of the emission window 21 itself.

The inlet 320 is defined at an axial end of the collimation conduit 32.

Furthermore, the inlet 320 is, for example, defined at or near the first axial end of the collimator body 31.

Preferably, the collimator body 31, at the first axial end thereof, comprises an attachment flange 310, e.g. circular and/or provided with axial through-holes, configured to be connected to the source 20, e.g. by means of a threaded connection, engaging said through-holes.

The attachment flange 310 perimetrically surrounds the inlet 320 of the collimation conduit 32.

The collimation conduit 32 further comprises an outlet 321 (axially opposite to the inlet 320), which is configured to emit a collimated portion (i.e., a central portion B1 of the beam B, preferably having a conicity lower than or equal to the conicity of the beam B emitted by the source 20).

The outlet 321 is defined at an axial end of the collimation conduit 32 opposite to the axial end thereof concerned by the inlet 320.

The outlet 321 is, for example, defined at or near the second axial end of the collimator body 31.

The inlet 320 and/or outlet 321 may be opened (through) or occluded by a window of X-ray transparent material.

Preferably, the collimation conduit 32 has a rectilinear longitudinal axis, preferably coinciding with the longitudinal axis A of the collimator body 31 (i.e. in use it is arranged parallel and coaxial to the central axis of the beam B emitted by the source 20).

For example, the collimation conduit 32 has a substantially cylindrical shape (having a constant cross-section throughout its longitudinal extension, with the inlet 320 and the outlet 321 defining the opposite open axial ends of the collimation conduit 32 itself).

The collimation conduit 32 has a (minimum) internal diameter substantially equal to (or less than) the diameter of the emission window 21 of the source 20.

The collimation conduit 32, furthermore, has a length (given by the axial distance between the inlet 320 and the outlet 321) substantially equal to (or greater than) 15 times the diameter, for example equal to 6 cm.

It is not excluded that the collimation conduit 32 may have a conical shape (e.g. converging from the inlet 320 towards the outlet 321).

The collimator body 31 and/or at least one internal lining of the collimation conduit 32 is made of at least one material adapted to shield/absorb X-rays (of the beam B emitted by the source 20).

For example, such a material is selected from the group consisting of tungsten, lead, steel, bronze and brass; preferably it is tungsten.

In practice, the collimation conduit 32 is configured to cut the emission cone of the beam B, so as to let only an internal portion B1 thereof pass towards the outlet 321 and to shield/absorb an external, more divergent portion thereof.

In addition, a derivation conduit 33 is provided in the collimator body 31.

The derivation conduit 33 comprises an inlet 330, configured to let at least a peripheral portion B2 of the beam B emitted by the source 20 enter the derivation conduit 33.

For example, the inlet 330 of the derivation conduit 33 is defined at an axial end of the derivation conduit 33.

Figure 2:
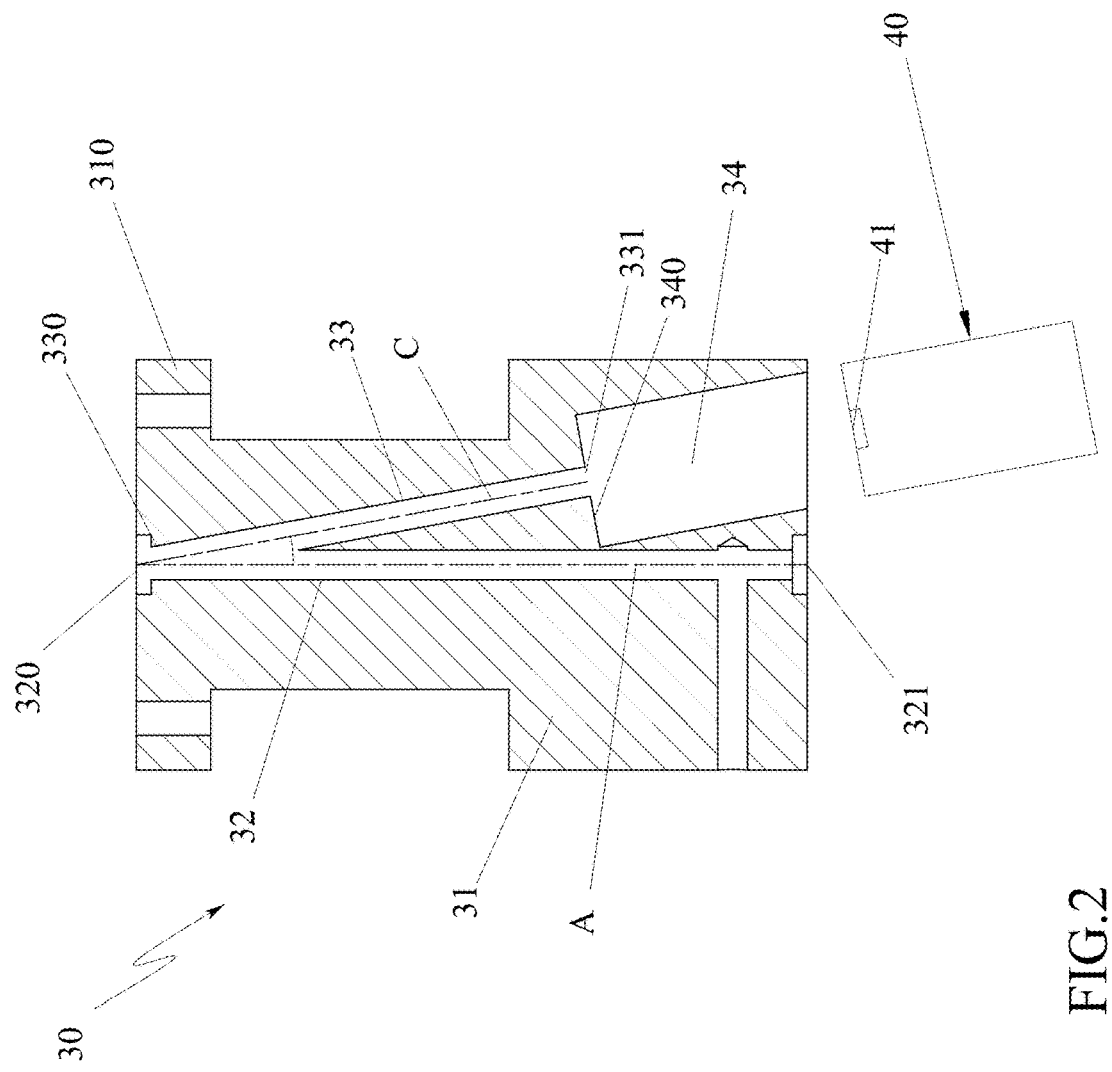
FIG. 2 is a longitudinal section (and exploded) view of a first embodiment of the collimator according to the invention.

In a first embodiment shown in FIGS. 1 and 2, for example, the inlet 330 of the derivation conduit 33 opens (and branches out) at the collimation conduit 32.

In particular, the inlet 330 of the derivation conduit 33 opens at an axial section of the collimation conduit 32 proximal to the inlet 320 of the collimation conduit 32 itself.

The inlet 330 defines a radial or substantially radial opening of the collimation conduit 32.

Preferably, one end of the inlet 330 substantially coincides with the inlet 320 of the collimation conduit 32.

Further, the inlet 330 of the derivation conduit 33, i.e., its proximal end at the inlet 32 of the collimation conduit 32, is defined at or near the first axial end of the collimator body 31.

Figure 4:
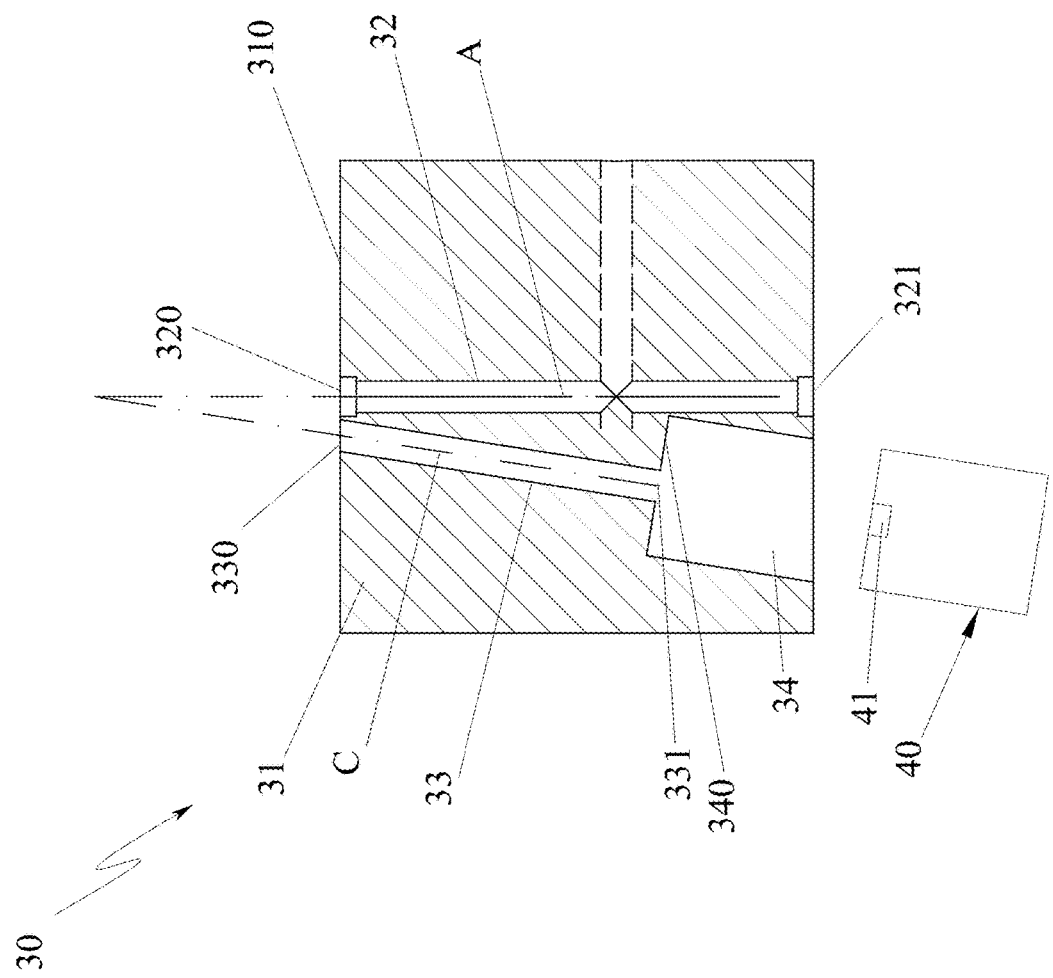
FIG. 4 is a longitudinal section (and exploded) view of a second embodiment of the collimator according to the invention

In a second embodiment shown in FIG. 4, the derivation conduit 33 is separated from the collimation conduit 32.

In this second embodiment, the inlet 330 of the derivation conduit 33 is placed alongside (radially) the inlet 320 of the collimation conduit 320 and at a non-null distance therefrom.

Furthermore, the inlet 330 of the derivation conduit 33 is, for example, defined at or near the first axial end of the collimator body 31 (at the side of the inlet 320 of the collimation conduit 32, for example, coplanar thereto).

The inlet 330 defines, in such a case, an axial or substantially axial opening of the collimator body 31 (arranged at the first axial end thereof).

In both embodiments, then, the derivation conduit 33 further comprises an outlet 331 (axially opposite to the inlet 330), which is configured to emit the peripheral portion B2 of beam B that has entered the inlet 330 (and travelled through the derivation conduit 33).

The outlet 331 is defined at an axial end of the derivation conduit 33 opposite the axial end of the derivation conduit concerned by the inlet 330.

The outlet 331 is, for example, defined as proximal to the second axial end of the collimator body 31, preferably at a non-null distance therefrom.

The inlet 330 and/or outlet 331 may be opened (through) or occluded by a window of X-ray transparent material.

Preferably, the derivation conduit 33 has a rectilinear longitudinal axis C.

The longitudinal axis C of the derivation conduit 33 is inclined by a predetermined angle $\alpha$ with respect to the longitudinal axis A of the collimation conduit 32 (so as to diverge from it), wherein the angle $\alpha$ is, preferably, an acute angle, for example an angle less than or equal to the maximum divergence angle of the (conical fan defined by the) beam B emitted by the source 20.

The derivation conduit 33, in particular, is configured to be passed through (from inlet 330 to outlet 331) by an angular portion of the perimeter portion B2 (circular) of the beam B emitted by the source 20.

For example, the derivation conduit 33 has a substantially cylindrical shape (with a constant cross-section throughout its longitudinal extension, with the inlet 330 and the outlet 331 defining the opposite open axial ends of the derivation conduit 33 itself).

The derivation conduit 33 has an internal (minimum) diameter substantially equal to (or less than) the internal diameter of the collimation conduit 32.

Advantageously, the derivation conduit 33 has a length (given by the axial distance between the inlet 330 and the outlet 331) substantially less than (or at most equal to) the length of the collimation conduit 32.

In other words, the distance between the outlet 331 and the inlet 330 of the derivation conduit 33 is less than the distance between the outlet 321 and the inlet 320 of the collimation conduit 32.

An internal lining of the derivation conduit 33 is made of at least one material adapted to shield/absorb X-rays (of the beam B emitted by the source 20).

A housing seat 34 (e.g. cylindrical) is also provided in the collimator body 31, which is arranged for example proximal to the second axial end of the collimator body 31 itself.

The housing seat 34 is, for example, defined by a cavity (open on one side, for example open at the second axial end of the collimator body 31) made in the collimator body 31, for example laterally with respect to (the outlet 321 of) the collimation conduit 32.

For example, the housing seat 34 comprises a back wall 340, substantially orthogonal to the longitudinal axis C of the derivation conduit 33.

The outlet 331 of the derivation conduit 33 leads to (and is contained in) the (back wall 340) of the housing seat 34.

The apparatus 10, and preferably the collimator 30, further comprises a reference detector 40, which is configured to receive at least a portion of the beam B, for example at least a perimeter portion B2 of the beam B that has passed through the derivation conduit 33.

The reference detector 40 is for example a spectroscopic sensor based on CdZnTe (CZT).

Preferably, the reference detector 40 is configured to measure a value $v_0$ of intensity I (of the perimeter portion B2) of the beam B it is intended to receive.

The reference detector 40 comprises an inlet window 41 configured to receive (the perimeter portion B2 de) the beam B.

For example, the reference detector 40 is rigidly fixed to the collimator body 31.

Advantageously, the reference detector 40 is accommodated (at least partially) within the housing seat 34 (e.g. substantially to measure).

In the example, the reference detector 40 protrudes outside the collimator body 31 (e.g. from the side of its second axial end), i.e. from the open end of the housing seat 34.

It is not excluded, however, that the reference detector 40 may be contained entirely within (the housing 43 of) the collimator body 31.

For example, the inlet window 41 faces (and is adjacent to) the outlet 331 of the collimation conduit 33.

In practice, the entire perimeter portion B2 of the beam B passing through the collimation conduit 33 is conveyed into the reference detector 40 (through the inlet window 41 thereof).

The apparatus 10 further comprises a measurement detector 50 (e.g. separate from the collimator 30, although it may be rigidly fixed thereto).

The measurement detector 50 is configured to receive at least a transmitted and/or reflected portion B3 of the beam B that was transmitted through the sample of material S (not absorbed by it) and/or reflected by the sample of material S, or a part (transmitted and/or reflected) of the central portion B1 of the beam that (exiting from the outlet 321 of the collimation conduit 32 of the collimator 30) interacted with the sample of material S (passing through it to be transmitted and/or being reflected by it).

The measurement detector 50 is for example a spectroscopic sensor based on CdZnTe (CZT).

Preferably, the measurement detector 50 is configured to measure a value $v_1$ of intensity I of the transmitted and/or reflected portion B3 of the beam B that it is intended to receive.

The measurement detector 50 includes an inlet window 51 configured to receive a transmitted and/or reflected portion B3 of the beam B.

For example, the measurement detector 50 faces the outlet 321 of the collimation conduit 32 of the collimator 30 and at a non-null distance, i.e., the inlet window 51 of the measurement detector 50 faces (and is parallel to) the outlet 321 of the collimation port 32, i.e., is arranged orthogonal to the central axis of the beam B.

In such a case, the measurement detector 50 is configured to receive at least a transmitted portion B3 of the beam B that was transmitted through the sample of material S (not absorbed by it).

Substantially, the measurement detector 50 is placed on the opposite side of the collimator 30 with respect to the sample of material S to be analysed.

The distance between (the inlet window 51 of) the measurement detector 50 and (the outlet 321 of) the collimation conduit 32 is greater than or equal to the maximum thickness of the sample of material S to be inspected by the apparatus 10.

For example, this distance can be adjusted according to (the thickness of) the sample of material S to be analysed.

In practice, between (the inlet window 51 of) the measurement detector 50 and (the outlet 321 of) the collimation conduit 32, a cavity is defined in which the sample of material S is adapted to be received, for example supported by a support, as it will be better described below.

Alternatively or additionally, for example, the measurement detector 50 is flanked (radially) with the outlet 321 of the collimation conduit 32 of the collimator 30 (version not illustrated in the drawings) and preferably at a non-null distance therefrom, i.e. the inlet window 51 of the measurement detector 50 is flanked with the outlet 321 of the collimation conduit 32, e.g. inclined with respect to it, i.e. arranged orthogonal to a central axis thereof inclined with respect to the central axis of the beam B by an angle $\beta$, wherein the angle $\beta$ is the angle of reflection of the central portion B of the beam B on the sample of material S.

For example, the angle $\beta$ may be adjusted according to the sample of material S to be analysed.

In such a case, the measurement detector 50 is configured to receive at least a reflected portion B3 of the beam B that has been reflected by the sample of material S (not absorbed by it).

Substantially, the measurement detector 50 is arranged on the same side of the collimator 30 with respect to the sample of material S to be analysed.

According to a preferred embodiment, the apparatus 10 comprises a support frame 60, for example a rigid one (i.e., one that is non-deformable to the usual stresses to which it is intended to be subjected in operation), which preferably also defines or comprises a substantially closed casing.

The source 20, the collimator 30 (with the reference detector 40) and preferably also the measurement detector 50 are fixed rigidly to the support frame 60, e.g. contained therein.

Preferably, the support frame 60 (in case the measurement detector 50 is configured to receive at least a transmitted portion B3 of the beam B) defines said gap.

In this case, the support frame 60 has a substantially (overall) "C" shape, in which on one branch the source 20, the collimator 30 (with the reference detector 40) are fixed (and contained) and on the other branch the measurement detector 50 is fixed (and contained).

According to an aspect of the invention, the apparatus 10 further comprises an electronic control unit 70 operatively connected to the measurement detector 50 and the reference detector 40.

The electronic control unit 70 comprises, for example, a processing module, such as a microprocessor or a processor, and a storage module.

The electronic control unit 70 is, for example, connected to a user interface, such as a screen and/or terminal or the like, through which a user can enter input values and/or receive information regarding output values transmitted and/or received by the electronic control unit 70.

The electronic control unit 70 is preferably configured to perform the determination/measurement of a (qualitative and/or quantitative) parameter indicative of the type (i.e. of a physical quantity) of the sample of material S, for example of the mass surface density $\rho_s$ of the sample of material S.

For example, the electronic control unit 70 is configured to compare the measured value $v_1$ of the intensity I (of the transmitted and/or reflected portion B3 of the beam B), measured in a predetermined time interval by the measurement detector 50, with the reference value $v_0$ of intensity I (of the peripheral portion B2 of the beam B), measured in the same time interval by the reference detector 40.

For example, the electronic control unit 70 is configured to repeat the aforesaid comparison for the entire measurement time, wherein the source 20 generates the beam B (which hits the sample of material S).

The electronic control unit 70, is therefore configured to determine a value $\rho_s$ of the aforesaid indicative parameter (i.e., the mass surface density $\rho_s$) of the sample of material S based on a comparison between the measured value $v_1$ of the intensity I (of the transmitted and/or reflected portion B3 of the beam B) and the reference value $v_0$ of intensity I (of the peripheral portion B2 of the beam B).

For example, the electronic control unit 70 is configured to calculate the value $\rho_s$ (of the mass surface density) using the following formula:

$$\varrho_s = \frac{\log\left(\frac{v_0}{Kv_1}\right)}{\Psi};$$

wherein:

$v_1 = I(\varepsilon)$ corresponds, more generally, to the intensity vector I (of the transmitted and/or reflected portion B3 of the beam B) as a function of the photon energy $\varepsilon$, $v_0 = KI_0(\varepsilon)$ corresponds, more generally, to the intensity vector $I_0$ (of the peripheral portion B2 of the beam B) as a function of the energy of the photons $\varepsilon$ multiplied by a proportionality constant K, which only depends on the known geometry of the apparatus 10, $$\Psi = \sum_i w_i \mu_i(\varepsilon)$$

corresponds, more generally, to the sum of the mass attenuation (coefficients) $\mu_i(\varepsilon)$ as a function of the photon energy, weighted by the weight fractions $w_i$ of the elements present in the material being examined.

The mass attenuation coefficients $\mu_i(\varepsilon)$ are known and tabulated for each element.

For example, the apparatus 10 described above may be used in a plant (e.g., a plant producing manufactured products and/or objects defining samples of material S to be analysed).

The system may comprise a conveyor, configured to define the aforesaid support for the samples of material S to be analysed, which has a support surface (e.g. horizontal), preferably movable, on which the samples of material S to be analysed rest (and advance).

The apparatus 10, e.g. its support frame 60, may be fixed (rigidly or movably) to the conveyor, e.g. to an edge thereof, such that the outlet 321 of the collimator 30 directs the central axis of the beam B towards the sample of material S resting on the support plane of the conveyor, e.g. substantially orthogonal to that support plane.

The apparatus 10 may be configured to perform the aforesaid inspection/measurement on each of the samples of material S passing through it (on the conveyor) or on a predetermined (random) number of samples of material S, as required.

The invention thus conceived is susceptible to many modifications and variants, all falling within the same inventive concept.

Moreover, all the details can be replaced by other technically equivalent elements.

In practice, any materials and also any contingent shapes and sizes may be used, depending on the needs, without departing from the scope of protection of the following claims.

The invention claimed is:

1. An X-ray collimator that comprises:
    a collimator body comprising:
        a collimation conduit provided with an inlet, configured to be connected to an X-ray source for the inlet of a beam (B) of X-rays, and an outlet, configured to emit a collimated portion (B1) of the X-ray beam (B); and
        a derivation conduit inclined with respect to the collimation conduit, wherein the derivation conduit is provided with an inlet, configured to be connected to the X-ray source for the inlet of a peripheral portion (B2) of the same X-ray beam (B) emitted by the source, and an outlet;
    a reference detector fixed to the collimator body and provided with an inlet window facing the outlet of the derivation conduit,
    wherein the collimator body comprises an attachment flange configured to be connected to the X-ray source by a threaded connection.

2. The collimator according to claim 1, wherein the collimator body comprises a housing seat configured to house at least one portion of the reference detector, wherein the outlet of the derivation conduit leads into said housing seat at the inlet window of the reference detector.

3. The collimator according to claim 1, wherein the distance between the outlet and the inlet of the derivation conduit is less than the distance between the outlet and the inlet of the collimation conduit.

4. The collimator according to claim 1, wherein the derivation conduit branches, diverging therefrom, from the collimation conduit and the inlet of the derivation conduit communicates with the collimation conduit.

5. The collimator according to claim 1, wherein the derivation conduit is separate from the collimation conduit and the inlet of the derivation conduit is placed alongside the inlet of the collimation conduit and at a non-null distance therefrom.

6. An X-ray inspection apparatus on a sample of material to be analysed, which comprises:
    an X-ray source configured to generate an X-ray beam;
    a collimator of the X-ray beam emitted by the source according to claim 1; and
    a measurement detector.

7. The apparatus according to claim 6, wherein the measurement detector faces the outlet of the collimation conduit and at a non-null distance therefrom so as to receive X-rays transmitted through the sample of material, between the outlet of the collimation conduit and the measurement detector a gap being defined in which the sample of material is adapted to be housed.

8. The apparatus according to claim 6, wherein the measurement detector is flanked with the outlet of the collimation conduit and at a non-null distance therefrom, in a position such as to receive X-rays reflected by the sample of material.

9. The apparatus according to claim 6, which comprises:
    a support frame to which the X-ray source, the X-ray collimator and the measurement detector are rigidly fixed.

10. The apparatus according to claim 6, which comprises an electronic control unit operatively connected to the measurement detector and to the reference detector, wherein the electronic control unit is configured to:

a) compare a measured value of the intensity of the X-ray beam measured in a predetermined time interval by the measurement detector with a reference value of the intensity of the X-ray beam measured in the same time interval by the reference detector; and
b) determine a value of a parameter indicative of the type of the sample of material on the basis of the comparison between the measured value and the reference value.

11. The apparatus according to claim 10, wherein the indicative parameter is a mass surface density.

* * * * *

UNITED STATES PATENT AND TRADEMARK OFFICE
CERTIFICATE OF CORRECTION

| | |
|---|---|
| PATENT NO. | : 11,854,712 B2 |
| APPLICATION NO. | : 17/510857 |
| DATED | : December 26, 2023 |
| INVENTOR(S) | : Nicola Zambelli et al. |

It is certified that error appears in the above-identified patent and that said Letters Patent is hereby corrected as shown below:

On the Title Page

Please delete item "(71) Applicant: DUE2LAB S.R.L., Parma (IT)" and replace with
--(71) Applicant: DUE2LAB S.R.L., Scandiano (REGGIO EMILIA) (IT)--

Please delete item "(73) Assignee: DUE2LAB S.R.L., Scandiano (IT)" and replace with
--(73) Assignee: DUE2LAB S.R.L., Scandiano (REGGIO EMILIA) (IT)--

Signed and Sealed this
Thirteenth Day of February, 2024

Katherine Kelly Vidal
*Director of the United States Patent and Trademark Office*